Jan. 13, 1953   J. R. RHINEHART ET AL   2,625,236
APPARATUS FOR SEPARATING GASES FROM LIQUID
Filed Aug. 26, 1948   4 Sheets-Sheet 1

Inventors
John R. Rhinehart &
Charles H. Eshrich
Philip G. Hilbert
Attorney

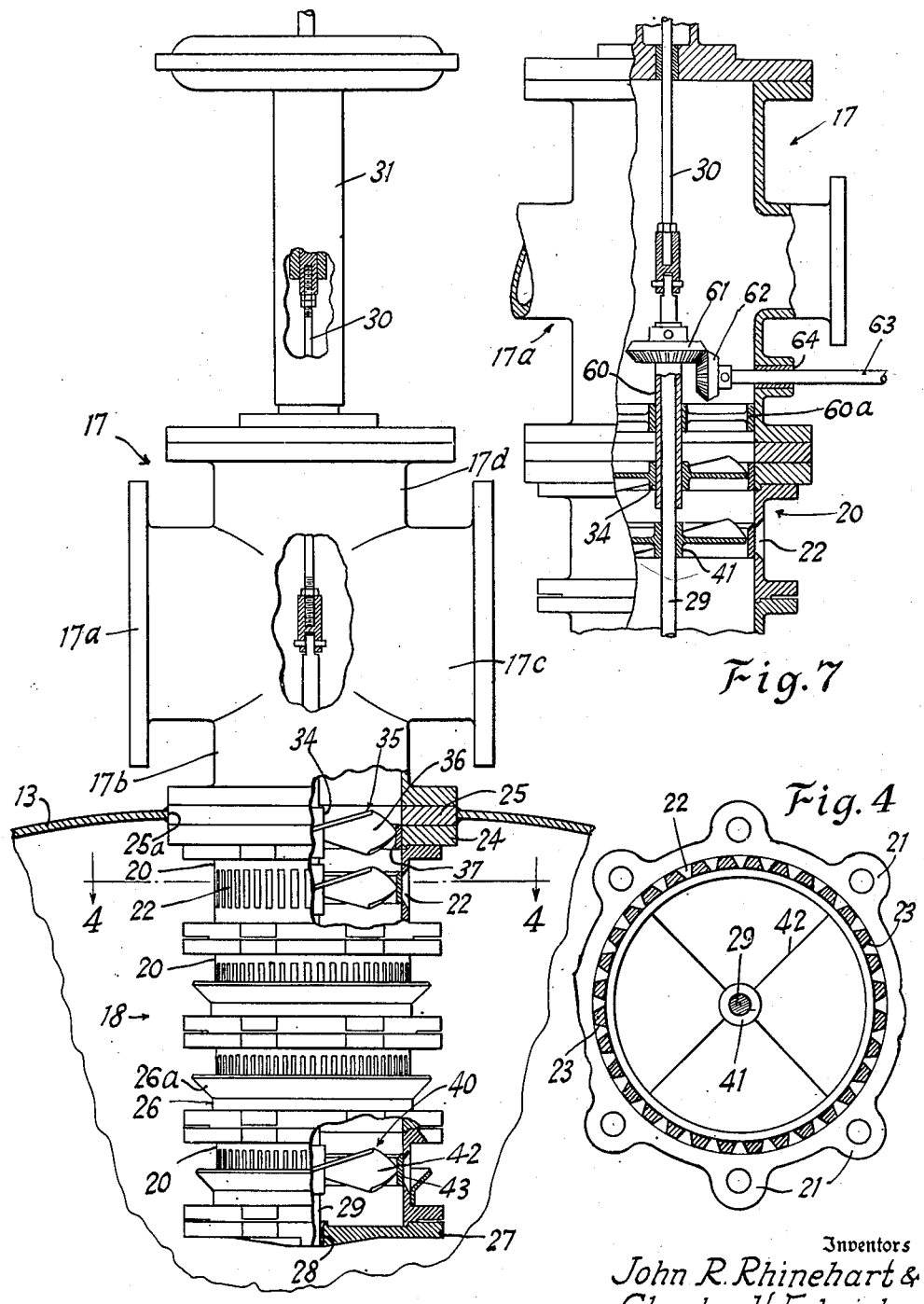

Inventors
John R. Rhinehart &
Charles H. Eshrich
Philip G. Hilbert
Attorney

Inventors
John R. Rhinehart &
Charles H. Eshrich

Patented Jan. 13, 1953

2,625,236

UNITED STATES PATENT OFFICE 2,625,236

APPARATUS FOR SEPARATING GASES FROM LIQUID

John R. Rhinehart, Ridgewood, and Charles H. Eshrich, Hasbrouck Heights, N. J., assignors to Belco Industrial Equipment Division, Inc., Paterson, N. J., a corporation of New Jersey Application August 26, 1948, Serial No. 46,284

3 Claims. (Cl. 183—2.5)

This invention relates to a method and apparatus for separating gases from liquids. The invention is particularly adapted for treating liquids such as boiler feed water, fruit juices or other liquids for the purpose of separating entrained oxygen, carbon dioxide, ammonia or other volatile materials therefrom.

In degasifying liquids, the practice has been to spray the liquid into a chamber containing steam to remove a portion of the gases entrained in the liquid and then passing the partially degasified liquid into contact with steam heated trays, baffles or scrubbers disposed within the chamber, to remove another portion of the entrained gases. Reliance has been placed to a large extent on the scrubbers to reduce the gas content of the liquid to a minimum amount.

Accordingly, an object of this invention is to provide an improved method and apparatus for separating entrained gases from a liquid wherein the liquid is converted into finely subdivided particles, the particles are simultaneously agitated and subjected to conditions of temperature and pressure whereby the particles of liquid are caused to boil almost instantaneously, thereby causing the separation of an unusually high proportion of the gases entrained in the liquid.

A further object of this invention is to provide an improved method for separating gases from a liquid by passing a stream of the liquid into atomizing means wherein the stream is deflected in directions substantially transverse to the axis of the stream and simultaneously spun in a spiral path so as to impart a substantial tangential component to the spun liquid and passing it through multiple orifices in the atomizing means thereby finely subdividing the liquid into particles forming a clodlike formation, agitating the particles under conditions of temperature and pressure which will cause substantially instantaneous boiling of the particles and consequent separation of the entrained gases and the coalescence of the degasified particles into liquid films.

Still another object of this invention is to provide liquid degasifying apparatus which includes a storage tank for receiving the degasified liquid, an atomizing chamber communicating with the storage tank, multijet atomizing means disposed within the chamber including movable means for adjusting the size of the jets and means for spinning liquid toward the jets with a substantial tangential component, means disposed externally of the atomizing chamber for moving the movable means, the operation of the moving means being automatically controlled by means responsive to the level of liquid in the storage tank or by the pressure of the liquid flowing into the atomizing means or by both liquid level means and the pressure of the liquid flowing into the atomizing means.

Yet another object of this invention is to provide liquid degasifying apparatus which is compact, which comprises a minimum number of parts, which will not readily get out of order, which is practical and efficient under varying conditions of use together with a procedure which is highly effective in reducing the entrained gas content of liquids to an exceedingly small amount.

Other objects of this invention will in part be obvious and in part hereinafter pointed out.

The invention accordingly consists in the features of construction, combinations of elements, arrangement of parts and procedural steps which will be exemplified in the construction hereinafter described, and of which the scope of invention will be indicated in the following claims.

In the accompanying drawings, in which is shown various illustrative embodiments of this invention:

Fig. 3 is a side elevational view of the atomizer and associated actuating means, with parts cut away and parts in section;

Fig. 4 is a sectional view taken on line 4—4 of Fig. 3;

Fig. 7 is a vertical elevation view of a modified form of atomizer, with parts cut away and parts in section

Figure 1:
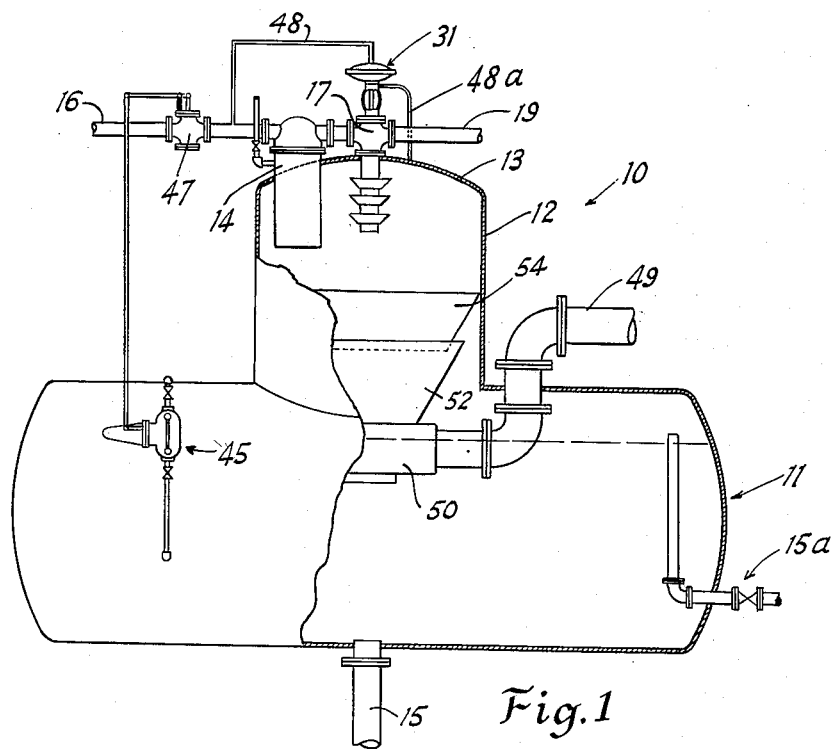
Fig. 1 is a side elevational view of the apparatus embodying the invention, with parts cut away and parts in section.
Figure 2:
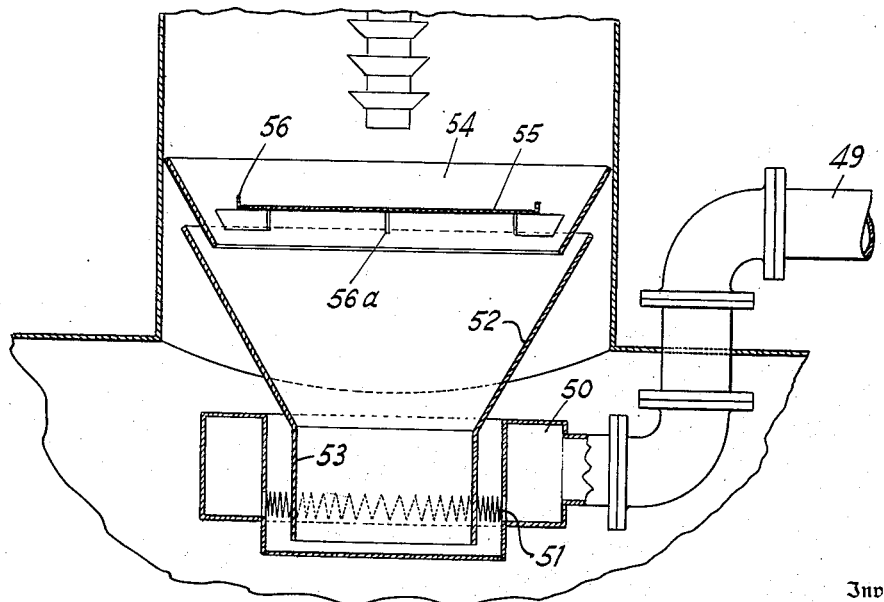
Fig. 2 is a vertical sectional view of the steam inlet portion of the apparatus shown in Fig. 1.
Figure 5:
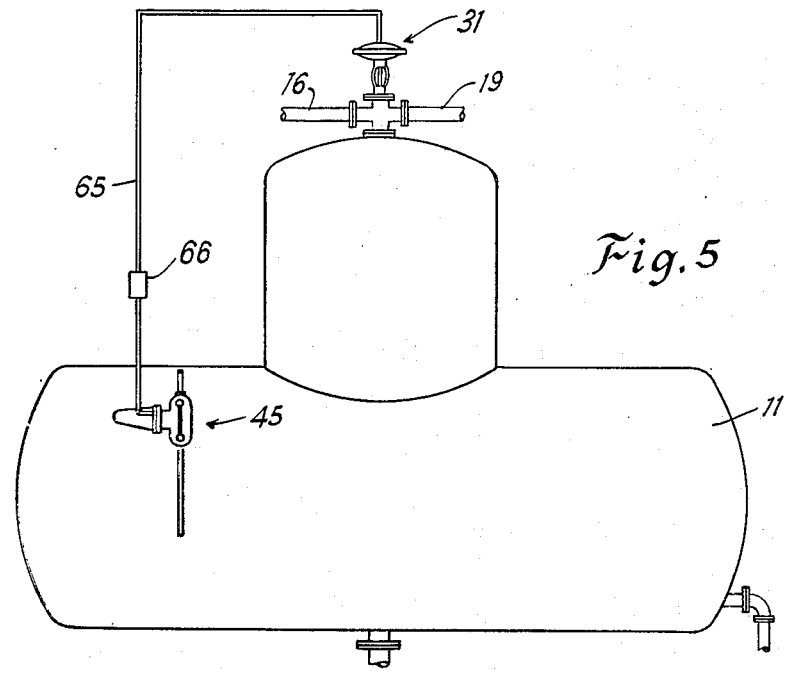
Fig. 5 is a side elevational view similar to that shown in Fig. 1 and illustrating a modified form of atomizer control.
Figure 6:
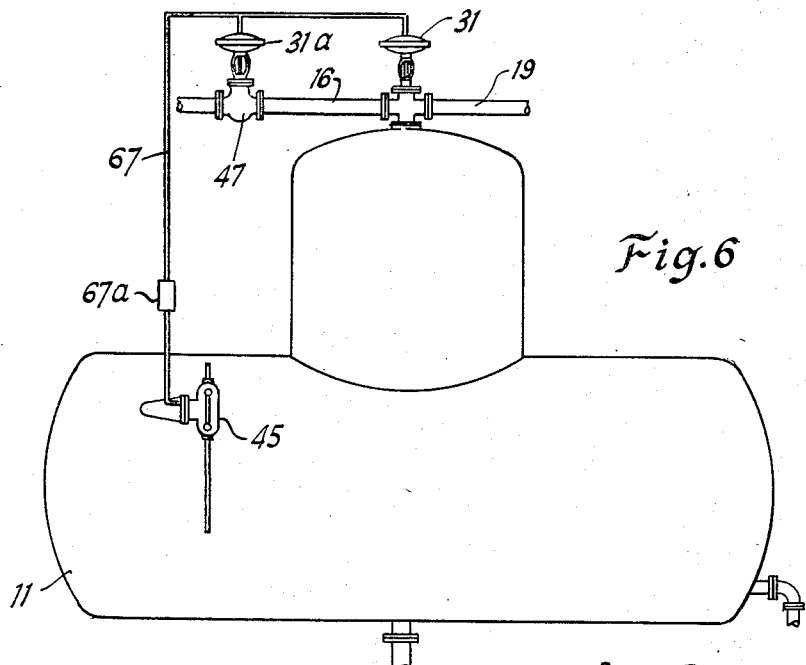
Fig. 6 is a side elevational view similar to that shown in Fig. 1 and illustrating a further modification of the atomizer control.

Referring in detail to the drawings, 10 designates liquid-gas separating apparatus embodying the invention. The same comprises a horizontally disposed, cylindrical storage tank 11 for receiving the degasified liquid. The tank is provided with an upstanding, communicating, cylindrical atomizing chamber 12. The chamber 12 includes a top wall 13 on which is mounted a condenser and gas vent 14. The tank 11 is provided at its lower portion with an outlet 15 for drawing off the degasified liquid and an overflow pipe 15a.

Raw liquid to be degasified is introduced into the upper end of chamber 12 by means of a supply line 16 which is connected to one branch 17a of a cross pipe fitting 17 which is mounted on the top wall 13 of the chamber by means of another branch 17b. An atomizer 18 depends from the under side of the top wall 13, projecting into the chamber 12 and communicating at its upper end with the branch 17b of the fitting 17. A supply line 19 which is connected to another branch 17c of the fitting 17, is adapted to introduce boiler condensate or the like into the atomizer 18, for treatment.

As shown in Fig. 3, the atomizer 18 comprises a plurality of similar, vertically superposed, cylindrical outer sleeves 20. Each of the sleeves is formed with radially extending ears 21 and which are adapted to be vertically aligned to receive bolts, thereby securing the sleeves together. Each of the sleeves 20 is also formed with a plurality of closely spaced, parallel slots or orifices 22 extending about the periphery thereof. The orifices 22 comprise vertical, outwardly diverging walls 23, as shown in Fig. 4. The angle between each pair of orifice walls may be between about 30° and about 60°. Each of the orifices may have a maximum transverse dimension of about 0.25 inch.

The topmost sleeve 20 is bolted to a flanged, annular adapter member 24 which in turn is bolted to an annular rim member 25. The rim member 25 is disposed within an opening 25a formed in the top wall 13 of the chamber 12 and secured therein by welding or the like. The flanged portion of branch 17b of the fitting 17 is bolted or otherwise secured to the upper surface of the member 25. A deflector ring 26 is mounted on the outer surface of each sleeve 20 and includes an upwardly and outwardly extending conical wall portion 26a disposed opposite the orifices 22, for the purpose hereinafter appearing.

A circular disc 27 closes off the lower end of the lowermost sleeve 20. The disc 27 is formed with an axial opening in which is mounted a bearing 28. A shaft 29 is axially disposed within the sleeves 20, with its lower end slidably received in the bearing 28. The upper end of the shaft 29 extends through the annular member 25 and projects into the interior of the fitting 17 where it is connected to a coaxial shaft 30. The shaft 30 extends upwardly through the branch 17d of the fitting 17 and is connected to a pressure responsive, spring loaded, diaphragm type actuating device 31. The lower end of the device 31 is bolted or otherwise attached to the flanged portion of branch 17d of the fitting 17. It is apparent that the shaft 29 is adapted to be moved axially with respect to the sleeves 20 upon operation of the actuating device 31.

Mounted in the adapter member 24, is a deflector which comprises an axial hub portion 34 formed with a through opening through which the shaft 29 freely passes. Extending radially from the hub 34 are a plurality of similar, equiangularly disposed vanes 35. The vanes may be of the propeller type and have surfaces 36 inclined to the horizontal. The leading edge of one vane may be in substantial vertical alignment with the rear edge of an adjacent vane. The outer ends of the vanes 35 are welded or otherwise secured to the inner surface of a cylindrical sleeve 37. The outer surface of the sleeve 37 is fixed to the inner surface of the adapter member 24 by welding or the like.

Fixed on the shaft 29, in spaced longitudinal arrangement thereon, are a plurality of similar, axially movable deflector members 40. The deflectors 40 each comprise a hub portion 41 fixed to predetermined portions of the shaft 29 and a plurality of vanes 42 extending radially thereof. The vanes 42 are similar to the vanes 35, hereinbefore described, and are similarly disposed relative to the hub 41. The outer ends of the vanes 42 on each of the deflectors 40 are secured to the inner surface of a cylindrical inner sleeve 43. The inner sleeves 43 are concentric with the outer sleeves 20 with the outer surfaces of the sleeves 43 slidably contacting the inner surfaces of the sleeves 20.

The deflectors 40 are arranged on the shaft 29 so that in one position of the shaft, the orifices 22 in each of the outer sleeves 20 are covered or substantially covered by the inner sleeve 43 on one of the deflectors 40. It is apparent that upon axial movement of the shaft, the orifices are progressively covered or uncovered, depending upon the direction of movement of the shaft. The effective size of the orifices 22 may be accordingly regulated upon controlled operation of the actuating device 31. The deflectors 40 may be so positioned on the shaft 29 as to provide for orifice openings in one sleeve 20 of a size different from that of the orifice openings in another sleeve 20, upon axial movement of the shaft 29 to a given position.

Means is provided for automatically controlling the operation of the actuating device 31 and thereby regulating the effective size of the orifices 22 in sleeves 20. To this end the storage tank 11 is provided with a float operated level device 45 which may be connected by a mechanical linkage to suitable valve operating means on valve 47 interposed in the inlet line 16. The upper end of the actuating device 31 is connected to the line 16 between the valve 47 and the fitting 17 by a conduit 48. The pressure on the diaphragm in device 31 may be equalized by means of a conduit 48a interconnecting the lower end of the device 31 with the upper end of the chamber 12.

Steam is brought into the chamber 12 by means of an inlet 49 which is connected to an annular steam chest 50 disposed within the storage tank 11, opposite the lower end of the chamber. The chest 50 is provided on its inner periphery with a sawtooth outlet 51. A conical baffle 52 is mounted within the lower end of chamber 12. The baffle 52 includes a downwardly extending cylindrical portion 53 which is disposed concentrically within the annular chest 50. A conical baffle 54 is also mounted within the chamber 12. The lower portion of the baffle 54 overlaps the upper portion of baffle 52. A circular baffle plate 55 having an upwardly extending rim 56, is mounted within the lower portion of the baffle 54, by means of angle members 56a.

It will be apparent that in the operation of the apparatus shown in Figs. 1–4, the flow of raw liquid through line 16 by the valve 47 which is controlled by the float operated level device 45, which in turn is controlled by the level of treated liquid in the storage tank 11. Also, the pressure in the line 16 between valve 47 and fitting 17 controls the operation of the actuating device, which in turn determines the relative axial position of the shaft 29, thereby controlling the effective size of the orifices 22 in the atomizer 18.

A stream of raw liquid passing from the line 16 to the fitting 17 towards the atomizer 18, will impinge on the fixed deflector. The stream will be deflected in substantially transverse directions by the vanes 35 which will impart a spinning spiralling movement to the deflected stream. The spun liquid will then pass spirally downward through the successive deflectors 40. As the spiralling liquid contacts the vanes 42 of each of the deflectors 40, the liquid is again spun outwardly and has a substantial tangential component imparted thereto. The liquid then spins through the portions of the orifices 22 in sleeves 20 which are left exposed by the inner sleeves 43. As a result, the liquid will leave the atomizer in extremely finely subdivided form and will produce in effect a cloudlike formation within the chamber 12. As the finely divided particles of liquid leave the atomizer, they are deflected upwardly toward the top wall 13 of the chamber by means of the deflector rings 26.

The steam entering through the inlet 49, at a substantial velocity, passes through the outlet 51 and rises upwardly through chamber 12 in a tortuous path due to the baffles 52, 54, 55. The steam reaches the upper portion of the chamber in a highly agitated state and quickly intermingles with the floating, finely divided particles of liquid. The particles then become highly agitated and reach their boiling point almost instantaneously. As a consequence, gases entrained in the liquid, such as oxygen, carbon dioxide, ammonia or other volatiles not condensable at the temperature of the steam, are separated from the liquid very rapidly and in substantial amount. The separated gases or other volatiles are removed through the condenser and vent 14 or may be collected in any suitable manner.

After separation of the gases from the liquid particles, the degasified particles fall downwardly until they reach the baffle plate 55 and the baffles 52, 54 which are heated by the steam from chest 50. The liquid particles are quickly coalesced upon contact with the heated baffle plate and baffles. As the liquid particles impinge on the heated surfaces, a further boiling action may take place and thereby effect further separation of residual gases which may be still present in the liquid.

The lower portion 53 of the baffle 52 is immersed in gas free liquid which has passed down through the baffles and overflows over the steam chest 50 to be received in the storage tank 11. This in effect forms a liquid seal for the lower end of the chamber 12.

It has been found that with the incoming raw liquid atomized to a degree of subdivision that results in a cloud-like formation of particles and the agitation of the particles by the intermingling, turbulent steam, the boiling of the particles is almost instantaneous. The speedy boiling of the finely divided liquid particles results in an unusually high degree of separation of the entrained gases or other volatiles which are noncondensable under the conditions of treatment. It is possible with the operation of the atomizer as hereinbefore described to attain such a high degree of gas separation as to render the use of supplementary gas scrubbers, baffles, trays or other secondary treatments, optional. The apparatus disclosed herein is of particular utility in the case of marine installations where the roll of a ship seriously affects the operation of conventional baffles or trays.

It has been noted that not only is the oxygen content of liquids treated in the manner described, reduced to a point heretofore believed unattainable, but that in addition other entrained gases such as carbon dioxide and ammonia, are also separated from the liquid in very substantial amounts. In the case of liquids which have been pretreated with chemicals which leave a residue of carbon dioxide in free or combined form, the fineness of the atomized liquid particles as well as the rapid boiling action results in speedy separation of the gas. Natural waters which normally contain varying amounts of bicarbonates, when treated, appear to readily yield up separable carbon dioxide which was originally in combined form. Similarly, ammonia present in liquids either in free or combined forms, is readily separated from the liquid during its treatment.

It is understood that the apparatus embodying the invention may be used to treat water, fruit juices or other liquids having entrained gases which are separable from the liquid under conditions of treatment.

The orifices 22 in the sleeves 20 are self cleaning, since the axial movement of the inner sleeves 43, is effective in removing any incrusted solids which may collect on the inner surfaces of the sleeves 20, particularly at the orifices.

Condensate from a steam boiler or the like may be brought into the atomizer 18 for treatment, through line 19. If the condensate has a relatively low pressure as it enters the fitting 17, it is desirable to increase its velocity in order to insure proper atomization. To this end, the deflector 33 is arranged for rotational movement as shown in Fig. 7. For this purpose the hub 34 of the deflector is fixed to a hollow shaft 60 which is rotatably mounted on shaft 29. The shaft 60 may be supported against axial movement by means of a spider 60*a* mounted within the fitting 17. A bevel gear 61 is fixed to the upper end of shaft 60 and meshes with a bevel gear 62 fixed on one end of a horizontally disposed rotatable shaft 63. The shaft 63 is mounted in a suitably packed through bearing 64 fixed in a wall portion of the fitting 17. The externally projecting portion of the shaft 63 is adapted to be rotated by means not shown, thereby rotating shaft 60 and imparting rotary movement to the deflector 33. Such arrangement will increase the velocity of approach of the condensate as it is spun towards the orifices 22 in the sleeves 20.

The rotation of the deflector 33 is also effective to increase the velocity of approach in the case of treatment of liquids having a relatively high viscosity. It is understood that the deflectors 40 may also be so arranged as to be rotated as well as moved axially, by conventional mechanical means, thereby further increasing the velocity of approach of a stream of liquid passing through the atomizer 18.

In Fig. 5, is shown an arrangement for automatically controlling the axial movement of the inner sleeves of the atomizer 18 wherein the float operated level device 45 is directly connected to the actuating device 31 by means of a pneumatic or hydraulic line 65 and a pilot 66. In this instance, the axial movement of the shaft 29 is directly responsive to the specific level of the treated liquid in storage tank 11.

In Fig. 6, is shown another arrangement for automatically and simultaneously controlling the operation of the actuating device 31 and the valve 47 in line 16. To this end, the float operated level device 45 is connected to the device 31 by a pneumatic or hydraulic line 67 and pilot 67*a*.

Valve 47 is operated by a device 31a, similar to device 31 and also connected to line 67.

It is understood that the lines 65, 67 may be replaced with mechanical linkages for operating the valve 47 and the device 31.

Figure 8:
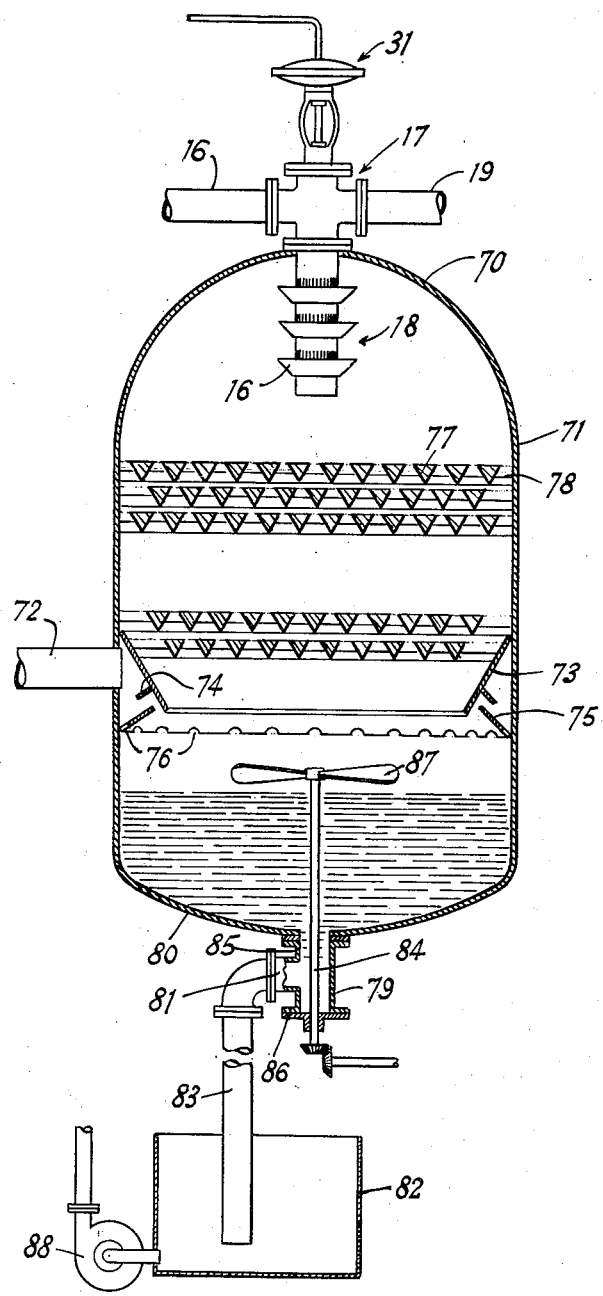
Fig. 8 is a side elevational view of apparatus embodying the invention and illustrating a modification thereof, with parts in section.

The atomizer 18 may also be used under conditions of reduced pressure and temperature, as shown in Fig. 8. The atomizer 18 together with fitting 17 and device 31 is mounted on the hemispherical top wall 70 of a vertically disposed cylindrical chamber 71. The chamber 71 is connected to a vacuum pump or other vacuum creating means, not shown, by a line 72 communicating with a lower portion of the chamber. A conical deflector or baffle 73 is mounted within the chamber opposite line 72. Extending from the lower portion of the deflector 73 is an annular apron 74 which extends outwardly and downwardly toward the inner surface of the chamber but terminating short thereof. A conical member 75 is mounted on the inner surface of the chamber below the apron 74. The inner rim of member 75 extends upwardly and inwardly toward the deflector 73 but terminating short thereof. The apron 74 and member 75 are in overlapping relation to each other. The member 75 is formed with a plurality of peripherally spaced openings 76 adjacent the inner surface of chamber 71.

A plurality of metal or wood staves 77 are mounted in spaced relation on suitable transverse supports 78 fixed within the chamber between the deflector 73 and atomizer 18. A T fitting 79 is mounted in the bottom wall 80 of chamber 71. One branch 81 of the fitting is connected to a storage tank 82 by a barometric leg 83. A vertically disposed, rotatable shaft 84 is mounted for rotation in the opposite branches 85, 86 of fitting 79 and which are provided with suitable packings. The upper end of shaft 84 projects into the lower portion of chamber 71 and has a horizontally disposed fan 87 fixed thereto. The downwardly extending portion of shaft 84 is adapted to be rotated by means not shown.

The apparatus may be operated at pressures as low as 1 inch of mercury and at temperatures short of the solidification point of the liquid being treated. The liquid introduced into the atomizer 18 through lines 16 or 19, is atomized in the manner previously described, producing a cloudlike formation of very finely divided particles which are directed upwardly toward the dome formed by the top wall 70 by the deflector ring wall portions 26a. The rotating fan 87 agitates the fog or cloudlike formation and under the condition of reduced pressure, almost instantaneous boiling of the liquid particles takes place. The degasified liquid particles impinge on the surfaces of the staves 77 and coalesce into sheets on films of liquid which is collected in the storage tank 82 by way of the barometric leg 83. The separated gases pass through the baffle 73 and between the member 75 and apron 74 and are removed in the vacuum line 72. Any liquid collecting on member 75 passes downwardly through openings 76 therein. A pump 88 connected to storage tank 82 may be used to transfer the gas free liquid to any desired point.

It is understood that the operation of the inner sleeves in atomizer 18 may be automatically controlled by means of the device 31 which in turn may be controlled by a float level gauge in the storage tank and by valves in the inlet lines, in the manner previously described.

If desired, treated liquid may be recirculated through the atomizer 18, thereby reatomizing the treated liquid to remove minute residual amounts of gas which may be still present in the liquid. This may be readily accomplished by connecting outlet 15 of apparatus 10 with line 19 and using a recirculating pump if necessary. Such an arrangement also provides means for preheating the cold raw liquid coming into atomizer 18 through inlet line 16, since the treated liquid in storage tank 11 is at an elevated temperature.

Similarly, the lower end of chamber 71 may be connected to line 19 by a conduit including a recirculating pump. The liquid collecting in the chamber 71 may thus be reatomized to further reduce its gas content.

It will thus be seen that there is provided a method and apparatus in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings, is to be interpreted as illustrative and not in a limiting sense.

Having thus described our invention, what we claim as new and desire to protect by Letters Patent is:

1. Apparatus for separating gases from gas containing liquid comprising a chamber, means for atomizing the liquid in a portion of said chamber, said atomizing means comprising a pair of slidably contacting members, one of said members being formed with a plurality of orifices, the other of said members being adapted to regulate the size of said orifices upon relative movement of said members, pressure responsive actuating means operatively connected to one of said members for slidably moving said connected member relative to the other member and means responsive to a liquid level in said chamber including a pressure line connected to said actuating means for automatically controlling the operation of said actuating means.

2. In apparatus for separating gases from gas containing liquid, the combination of a chamber for storing gas free liquid, a line for supplying gas containing liquid, multi jet means for atomizing said gas containing liquid in a portion of said chamber and including a slidable member for regulating the size of the jets, means disposed externally of the chamber for moving said slidable member and means independent of the pressure in said line and controlled by the level of gas free liquid in said storage chamber for controlling the operation of said moving means.

3. In apparatus of the character described, the combination of a storage chamber for treated liquid, inlet means for bringing liquid to be treated into a portion of said chamber, atomizing means within said chamber and communicating with said inlet means, said atomizing means comprising a pair of slidably contacting members, one of said members being formed with at least one orifice, the other member being adapted to regulate the size of said orifices upon relative movement of said members, means disposed externally of said chamber and operatively connected to one of said members for effecting relative movement between said members, and fluid pressure means controlled by the level of the treated liquid in said storage chamber for automatically regulating the operation of said moving means independently of the pressure in said liquid inlet means.

JOHN R. RHINEHART.
CHARLES H. ESHRICH.

REFERENCES CITED

The following references are of record in the file of this patent:

UNITED STATES PATENTS

| Number | Name | Date |
|---|---|---|
| 1,836,338 | Rodman et al. | Dec. 15, 1931 |
| 1,943,890 | Gibson et al. | Jan. 16, 1934 |
| 1,947,407 | Cornell, Jr. | Feb. 13, 1934 |
| 2,060,242 | Pulley | Nov. 10, 1936 |
| 2,068,094 | Webre | Jan. 19, 1937 |
| 2,070,453 | Rodman | Feb. 9, 1937 |
| 2,345,217 | Rohlin | Mar. 28, 1944 |
| 2,375,528 | De Flon | May 8, 1945 |
| 2,452,716 | Bergquist | Nov. 2, 1948 |
| 2,457,605 | Sebald | Dec. 28, 1948 |